United States Patent [19]

Foo

[11] Patent Number: 5,549,496
[45] Date of Patent: Aug. 27, 1996

[54] METHOD OF PRODUCING A LOW-PRESSURE MERCURY VAPOR DISCHARGE LAMP

[75] Inventor: Onn Fah Foo, Kowloon, Hong Kong

[73] Assignee: Mass Technology (H.K.) Ltd., Kowloon, Hong Kong

[21] Appl. No.: 311,108

[22] Filed: Sep. 23, 1994

[30] Foreign Application Priority Data

Feb. 24, 1994 [GB] United Kingdom .................. 9403558

[51] Int. Cl.⁶ .................................. H01J 9/26; H01J 9/24
[52] U.S. Cl. ............................. 445/26; 65/54; 65/108; 445/22
[58] Field of Search ..................... 445/22, 26; 65/54, 65/108

[56] References Cited

U.S. PATENT DOCUMENTS

| | | | |
|---|---|---|---|
| 2,281,579 | 5/1942 | Henninger, Jr. et al. | 65/108 |
| 4,830,648 | 5/1989 | Klein et al. | 65/54 |
| 4,881,007 | 11/1989 | Egelstam | 445/26 |

*Primary Examiner*—P. Austin Bradley
*Assistant Examiner*—Jeffrey T. Knapp
*Attorney, Agent, or Firm*—Beveridge, DeGrandi, Weilacher & Young, L.L.P.

[57] ABSTRACT

A low-pressure mercury vapour discharge lamp comprises two or more glass discharge tubes disposed in side-by-side relationship. The tubes are joined by a tapered joint region defining a generally U-shaped connection between the tubes. The joint between the tubes is produced by heating the open ends of the tubes, butt-joining the thus-softened ends, and then tapering the joint by stretching same and bending it until the tubes reach their required disposition.

21 Claims, 2 Drawing Sheets

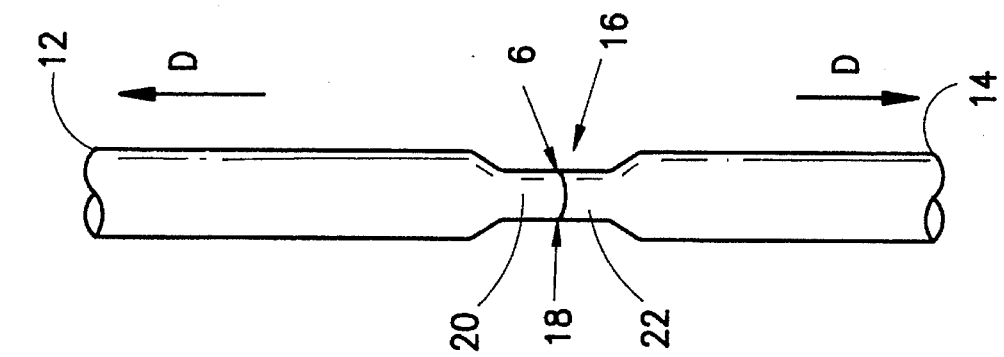
FIG. 4
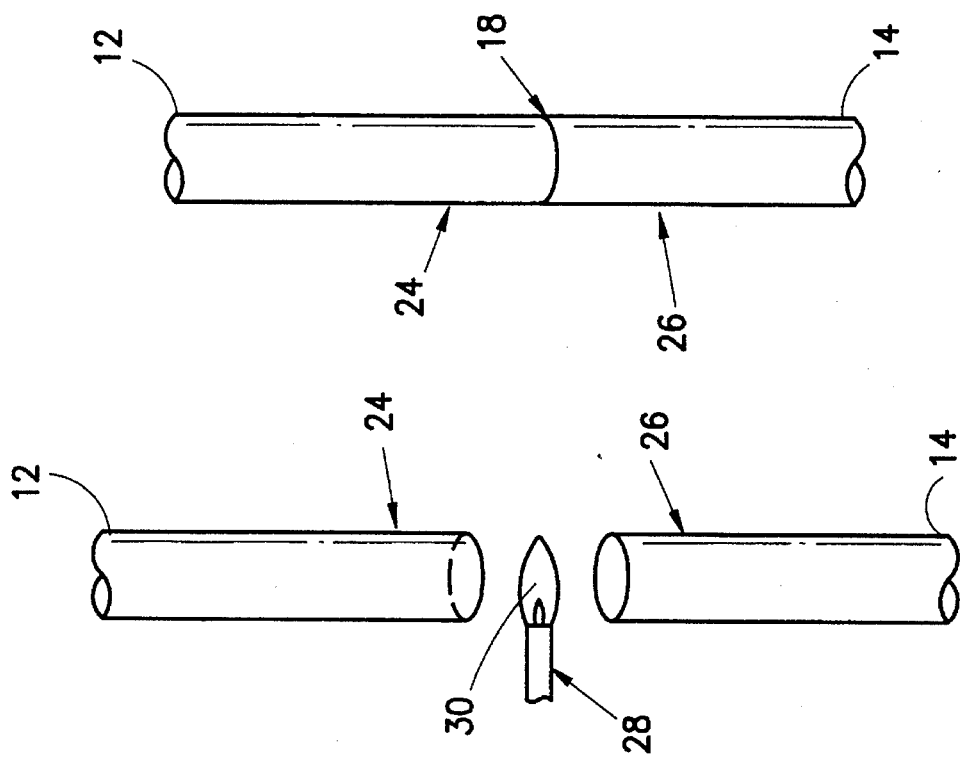
FIG. 3
FIG. 2
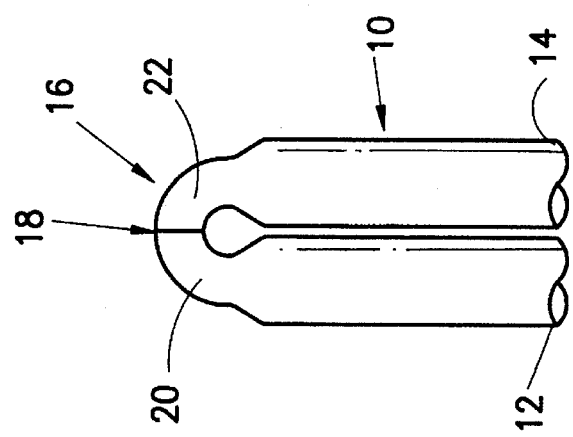
FIG. 1

METHOD OF PRODUCING A LOW-PRESSURE MERCURY VAPOR DISCHARGE LAMP

This invention relates to a method of producing a low-pressure mercury vapour discharge lamp. The invention may also be applicable to the production of other types of discharge lamps.

More particularly, the invention relates to a method of producing a discharge lamp comprising two or more substantially parallel co-extending glass discharge tubes, the discharge spaces of the two adjacent discharge tubes being interconnected by a coupling tube extending transverse to the axes of the discharge tubes. During operation of the lamp, the discharge passes predominantly through the discharge tubes. In the method the discharge tubes are first coated on the inside with a luminescent layer and closed at one end. Such a method is disclosed in German patent specification 858,105.

German patent specification 858,105 described a method in which the above-mentioned lamps are produced by providing an aperture in the glass wall of the discharge tube prior to deposition of a luminescent layer, the connecting coupling tubes being sealed thereto after the application of the luminescent layer.

UK patent specification GB 2 048 562 B recognizes that this method has the drawback that during the process of coating the discharge tube wall with luminescent material, which is often done by means of a suspension, liquid material can easily flow out through the aperture so that it is difficult to release a uniform coating on the wall. There is also the risk that fusion of the coupling tube to the discharge tube is made difficult by enclosure of luminescent material in the glass seal. This may cause stresses in the glass and the chance of fracture is considerable.

In attempt to overcome these drawbacks, the above mentioned UK patent specification proposes that such lamps are produced by a method in which the inner wall of the discharge tube is first coated with a luminescent layer and sealed at one end. Once a luminescent layer has been deposited on the inner wall, the tube is heated to soften the glass and an aperture is formed by applying pressure to the closed tube so that a laterally-extending collar having an open end is thereby formed. This process is repeated with a second discharge tube, and the tubes are then placed with their laterally extending collars adjacent one another. The collars are then fused together by further heating to form a coupling tube.

This latter method has several drawbacks including the fact that there is a need to form the collars in a controlled manner by the application of internal pressure to the tubes. Moreover, there is the obvious need to close the tubes at their ends before the process of generating the laterally-extending collar can begin. Accordingly, the technique is relatively complex and thus time-consuming and costly.

An object of the present invention is to provide a method of producing a mercury vapour discharge lamp comprising two or more joined discharge tubes providing improvements in relation to one or more of the matters discussed above, or generally.

According to the invention there is provided a method of making a mercury vapour discharge lamp, and a mercury vapour discharge lamp as such, as defined in the accompanying claims.

In an embodiment, there is provided a method in which glass tubes for use in a mercury vapour discharge lamp are heated so as to soften their open end portions, these open end portions are then butt-joined, and the thus butt-joined tubes are then caused to bend until they adopt a desired attitude relative to each other, for example a parallel attitude in side-by-side relationship.

By providing a simple butt-joining technique, the strength of the joint produced is significantly increased, and the attendant risk of fracture or leakage of the discharge tubes in the joint region is significantly reduced.

In addition, as the joint formed in the method of the invention can be readily caused not to have an uneven accumulation of glass at the joint between the tubes, this joint has "flexibility" when the discharge tubes are subjected to mechanical forces. Therefore the method of the embodiments results in lower internal stresses in the glass, and the risk of fracture in the region of the connection is significantly reduced.

In an embodiment, the method includes the step of stretching the butt-joint formed between the ends of the glass tubes, thereby causing a reduction in the transverse cross-sectional area of the region joining the two tubes. Such stretching is effected prior to bending the joint, and this has the benefit of facilitating the step of bending the joint, as such.

In the embodiment, the tubes to be joined are arranged generally in-line prior to joining, and are of generally linear form. It would be possible to use tubes other than linear tubes, provided the tube ends were of adequately similar cross-sectional shape and size for the production of a butt-joint by a heating and merging technique.

In the embodiment, the end regions of both of the tubes to be joined are softened prior to formation of the joint therebetween, so that the subsequent stretching and bending step is effected generally equally in relation to the glass of both tubes. It can be envisaged that in certain circumstances it might be desirable for the stretching and bending step to be concentrated more in one tube than in the other.

The invention also provides a mercury vapour discharge lamp in which two discharge tubes have been end-joined. The joint region tapers with respect to the cross-sectional dimensions of the tubes themselves. The joint between the two previously separate tubes is located in the region which is of tapered dimensions. No closed end is formed in either of the tubes adjacent their region of joining, as disclosed in the above-identified prior UK patent, or in the corresponding prior German specification.

In the embodiments described below, advantages provided include the avoidance of the need for utilizing a joining tube for interconnecting the discharge tubes, and thus only two glass components are required, as compared with the disclosure in the prior German specification. Likewise, there is no requirement for controlled application of pressure as in the prior UK specification, nor indeed a requirement to close the ends of the tubes to be joined prior to the pressure application step. All in all, the embodiments provide a joining technique which provides technical advantages while employing more generally conventional glass treatment steps.

Embodiments of the invention will now be described by way of example only, with reference to the accompanying illustrative drawings in which:

FIG. 1 shows a mercury vapour discharge tube assembly illustrating the joint region between the adjacent tubes;

FIGS. 2 to 4 illustrate three stages in the method of producing the joined tubes shown in FIG. 1, comprising end heating, butt-joining and then stretching the thus-formed joint;

Figure 7:
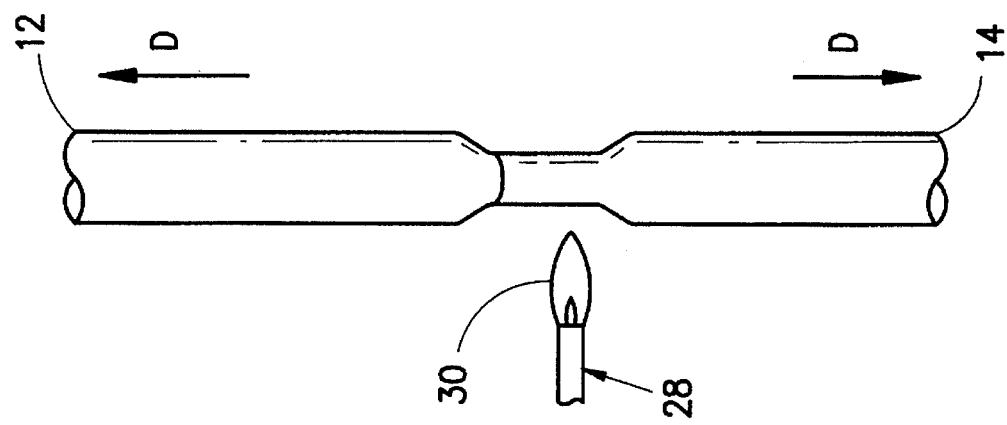
FIG. 7 shows an additional step of softening one tube after the two tubes have been joined but prior to bending.

As shown in FIG. 1, a mercury vapour discharge lamp 10 comprises glass discharge tubes 12, 14 having a joint region 16 incorporating a butt-joint 18. In the joint region 16, the tubes have portions 20, 22 of reduced cross-sectional area.

Tubes 12 and 14 are internally coated with a fluorescent material in a known manner. This coating step may be carried out either before or after the step of joining the tubes 12, 14.

In use, the fluorescent discharge extends through the joint region 16 and lengthwise of the tubes 12, 14 throughout a substantial portion of their longitudinal extents. The discharge extends between electrodes provided in the ends of the tubes (not seen in the accompanying drawings). The structure and arrangement of such features are well known in the art and do not constitute a novel part of the present invention, and are therefore described no further here. The tubes 12, 14 may be joined to further tubes to form a more extensive discharge lamp assembly.

Turning now to the method of joining the tubes 12, 14 it will be seen that the technique is illustrated in FIGS. 2, 3 and 4.

Broadly speaking, FIG. 2 illustrates the step of softening the end regions of the tubes to be joined, FIG. 3, illustrates butt-joining the ends, and FIG. 4 illustrates the step of then stretching the thus-formed joint. After that, the joint is then caused to bend until the tubes have the relative dispositions shown in FIG. 1, although alternative dispositions may be required for other applications.

As shown in FIG. 2, tubes 12 and 14 are disposed generally in a co-axial and in-line relationship with their end regions 24, 26 disposed in heating proximity to a burner 28 having a flame 30. In FIG. 2, the tube ends are shown spaced apart from flame 30. It may be necessary for the flame to play directly on the tube ends for the purposes described hereunder. The techniques of glass softening and joining are of course well known in the art of glass shaping and fabricating, and therefore these details are described no further here.

After the tube end regions 24, 26 have been suitably softened, the burner 28 and flame 30 are withdrawn, and the tube ends are moved toward each other and caused to form the butt joint 18 as shown in FIG. 3. At this point, the tube end regions 24 and 26 have been softened by flame 30, and are thus capable of being formed and shaped in the subsequent steps, as described below.

As shown in FIG. 4, tubes 12, 14 are then moved apart by a short distance D as indicated in FIG. 4, thereby to reduce the cross-sectional area of the joint region 16 formed therein. After that, the still soft glass in region 16 is bent by applying a bending force to the assembly seen in FIG. 4 so that tube 12 adopts the attitude seen in FIG. 1, with the tubes disposed with their axes generally Parallel to each other and in side-by-side disposition. During this bending step, butt-joint 18 remains strong and intact, thereby Preserving the sealed connection between the tubes 12 and 14.

Figure 5:
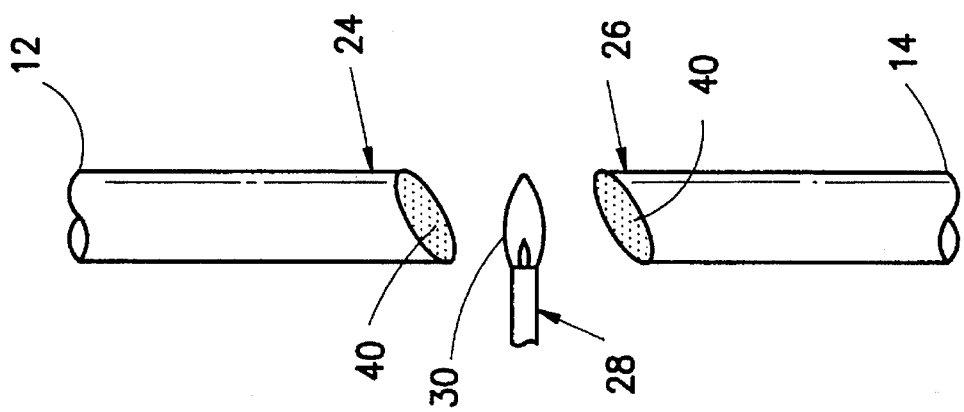
FIG. 5 illustrates an embodiment wherein the end portion of the tubes are inclined with respect to their respective major axis.

As shown in FIG. 5, the tubes 12 and 14 each may be previously formed with an end portion which is inclined with respect to the major axis of the respective tube. These tubes also can be softened, butt-joined, stretched and bent in the manner described with respect to FIGS. 1–4. FIG. 5 further shows that the inner surface of the tubes 12 and 14 may be coated with a fluorescent material 40 prior to the step of joining the tubes 12 and 14 together.

Figure 6:
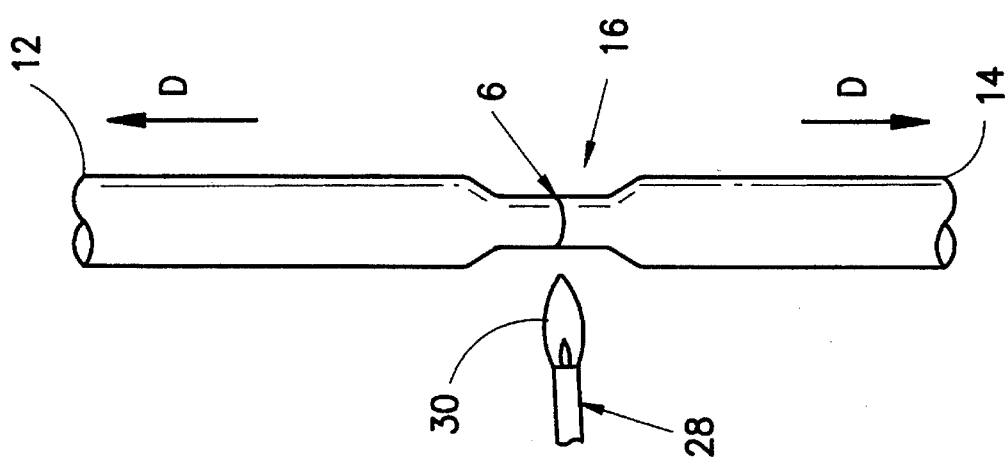
FIG. 6 shows an additional step of softening both tubes after they have been joined but prior to bending.

FIGS. 6 and 7 schematically illustrate additional steps which may be used in the process of the invention. Prior to bending, the joined tubes 12 and 14 may be softened by applying heat to both tubes, as shown in FIG. 6. The heat may be applied by the burner 28 which produces the flame 30. Alternatively, as shown in FIG. 7, the flame 30 from the burner 28 may be applied to only one of the two joined tubes prior to the bending step.

I claim:

1. A method of producing a joint between two glass discharge tubes of a low-pressure mercury vapour discharge lamp having two or more glass discharge tubes disposed in a side-by-side relationship, wherein discharge spaces of the discharge tubes are inter-connected by an inter-connecting joint extending transversely to lengthwise axes of the tubes, and wherein during operation of the lamp, the discharge passes through a major part of the discharge tubes, the method comprising the steps of:

heating an open end of each of the tubes to soften the glass in a region to be joined together to form the joint;

forming a butt joint between the heated ends to join the tubes together;

stretching the region of the joined tubes in order to reduce a cross-sectional dimension of the region; and thereafter bending the tubes into the side-by-side relationship, wherein said tubes are generally linear in form and are disposed generally in-line prior to said step of forming said butt-joint.

2. A method according to claim 1, further including the step of softening a portion of both tubes in the region by heating the tubes prior to the bending step.

3. A method according to claim 1, further including the step of softening a portion of only one of said tubes in the region prior to the step of bending.

4. A method according to claim 1, further including the step of applying a fluorescent material to inner surfaces of said tubes prior to the step of joining said tubes.

5. A method according to claim 4, further including the step of softening a portion of both of said tubes in the region prior to the step of bending.

6. A method according to claim 4, further including the step of softening a portion of only one of said tubes in the region prior to the step of bending.

7. A method of producing a joint between two glass discharge tubes of a low-pressure mercury vapour discharge lamp having two or more glass discharge tubes disposed in a side-by-side relationship, wherein discharge spaces of the discharge tubes are inter-connected by an inter-connecting joint extending transversely to lengthwise axes of the tubes, and wherein during operation of the lamp, the discharge passes through a major part of the discharge tubes, the method comprising the steps of:

heating an open end of each of the tubes to soften the glass in a region to be joined together to form the joint;

forming a butt joint between the heated ends to join the tubes together;

stretching the region of the joined tubes in order to reduce a cross-sectional dimension of the region;

softening a portion of only one of said tubes in the region; and thereafter bending the tubes into the side-by-side relationship.

8. A method according to claim 7, further including the step of applying a fluorescent material to inner surfaces of said tubes prior to the step of joining said tubes.

9. A method of producing a joint between two glass discharge tubes of a low-pressure mercury vapour discharge lamp having two or more glass discharge tubes disposed in a side-by-side relationship, wherein discharge spaces of the discharge tubes are inter-connected by an inter-connecting joint extending transversely to lengthwise axes of the tubes, and wherein during operation of the lamp, the discharge passes through a major part of the discharge tubes, the method comprising the steps of:

heating an open end of each of the tubes to soften the glass in a region to be joined together to form the joint, wherein at least one of said tubes is previously formed with an end portion which is inclined with respect to a major axis of said tube;

coaxially aligning the heated ends and forming a butt joint therebetween to join the tubes together; and thereafter bending the tubes into the side-by-side relationship.

10. A method according to claim 7, further including the step of applying a fluorescent material to inner surfaces of said tubes prior to the step of joining said tubes.

11. A method according to claim 9, further including the step of softening a portion of both tubes in the region by heating the tubes prior to the bending step.

12. A method according to claim 9, further including the step of softening a portion of only one of said tubes in the region prior to the step of bending.

13. A method according to claim 9, further including the step of stretching the region of the joined tubes in order to reduce a cross-sectional dimension of the region.

14. A method according to claim 13, wherein said tubes are generally linear in form and are disposed generally in-line prior to said step of forming said butt-joint.

15. A method according to claim 13, further including the step of softening a portion of both tubes in the region by heating the tubes prior to the bending step.

16. A method according to claim 13, further including the step of applying a fluorescent material to inner surfaces of said tubes prior to the step of joining said tubes.

17. A method according to claim 13, further including the step of softening a portion of only one of said tubes in the region prior to the step of bending.

18. A method according to claim 9, wherein said tubes are generally linear in form and are disposed generally in-line prior to said step of forming said butt-joint.

19. A method according to claim 18, further including the step of softening a portion of both tubes in the region by heating the tubes prior to the bending step.

20. A method according to claim 18, further including the step of applying a fluorescent material to inner surfaces of said tubes prior to the step of joining said tubes.

21. A method according to claim 18, further including the step of softening a portion of only one of said tubes in the region prior to the step of bending.

\* \* \* \* \*